(12) United States Patent
Donaldson

(10) Patent No.: US 8,163,995 B2
(45) Date of Patent: Apr. 24, 2012

(54) METHOD FOR APPLYING INSULATION WITH RESPECT TO AN ELECTRICAL BOX AND AN ELECTRICAL BOX FOR RECEIVING INSULATION WITH RESPECT THERETO

(75) Inventor: Roger Donaldson, White Stone, VA (US)

(73) Assignee: William F. Geier, White Stone, VA (US)

( * ) Notice: Subject to any disclaimer, the term of this patent is extended or adjusted under 35 U.S.C. 154(b) by 129 days.

(21) Appl. No.: 12/753,991

(22) Filed: Apr. 5, 2010

(65) Prior Publication Data

US 2010/0263899 A1   Oct. 21, 2010

Related U.S. Application Data

(60) Provisional application No. 61/169,342, filed on Apr. 15, 2009.

(51) Int. Cl.
*H05K 5/00* (2006.01)

(52) U.S. Cl. .............. 174/50; 174/54; 174/58; 439/535; 248/906

(58) Field of Classification Search ............... 174/50, 174/54, 58; 439/535; 248/906; 220/4.02
See application file for complete search history.

(56) References Cited

U.S. PATENT DOCUMENTS

| | | | | |
|---|---|---|---|---|
| 3,386,606 | A | * | 6/1968 | Pastrick .................. 220/3.94 |
| 3,440,308 | A | * | 4/1969 | Carbary et al. .............. 264/45.3 |
| 7,348,484 | B1 | * | 3/2008 | Ackerman et al. ............. 174/50 |
| 2009/0166052 | A1 | * | 7/2009 | Rupp ............................. 174/50 |

* cited by examiner

*Primary Examiner* — Dhirubhai R Patel
(74) *Attorney, Agent, or Firm* — Thomas & Karceski, PC

(57) ABSTRACT

An electrical box includes a top side wall, a right side wall, a bottom side wall, a left side wall, and a rear side wall. At least one check valve is disposed in an opening through at least one of the top side wall, the right side wall, the bottom side wall, the left side wall, or the rear side wall. The check valve defines a central opening through which insulation may be introduced to fill an air gap at least one of behind or around the electrical box. A method for introducing insulation through the electrical box also is described.

18 Claims, 14 Drawing Sheets

METHOD FOR APPLYING INSULATION WITH RESPECT TO AN ELECTRICAL BOX AND AN ELECTRICAL BOX FOR RECEIVING INSULATION WITH RESPECT THERETO

CROSS-REFERENCE TO RELATED APPLICATION(S)

This U.S. Non-Provisional patent application relies for priority on U.S. Provisional Patent Application Ser. No. 61/169,342, filed on Apr. 15, 2009, the contents of which are incorporated herein by reference.

FIELD OF THE INVENTION

The present invention concerns an electrical box behind which thermal insulation may be applied to minimize temperature transitions associated therewith. The present invention also concerns a method for applying thermal insulation behind an electrical box.

DESCRIPTION OF THE RELATED ART

When building a house or other structure, it is common to use wood or metal studs to support the walls for the structure. This is commonly referred to as "framing" a structure.

After framing is complete, it is common for an electrician to install the wiring that is intended for the structure. So that the structure's occupants have access to electricity, it is common to install a plurality of electrical boxes in the structure. These electrical boxes are usually affixed to the wood or metal studs that make up the framing for the structure. Ultimately, electrical outlets and electrical switches will be placed into the electrical boxes that are installed adjacent to the studs.

As should be appreciated by those skilled in the construction art, at the same time that the electrician installs the electrical boxes, he or she also runs the electrical wiring along the studs and connects the wiring to a central circuit breaker box. At this point in construction, the electrical wires for the individual electrical outlet are not yet connected to an outlet or switch. The wires are merely prepared to receive a standard electrical outlet or electrical switch, which installation occurs at a later time, closer to completion of the construction as a whole. As a general rule, the wires are coiled inside of the electrical box and left until the electrical outlet or electrical switch is installed. Often, the electrical wires are pushed or threaded through a "knockout" in the electrical box.

After the electrical boxes are positioned, but before the drywall is installed, it is common for a contractor to position insulation, in the form of fiberglass batts, between the studs that make up the framing for the walls. The fiberglass batts are inserted between the studs and around the electrical boxes.

It is in the insertion of the fiberglass batts between the walls and around the electrical boxes where an insulation deficiency may occur.

Specifically, to ensure that the insulation lies evenly between the studs, it is not uncommon for a carpenter or an electrician to pull the fiberglass batt away from the electrical box. When the insulation is pulled away from the electrical box, it is not uncommon for the insulation to be removed from behind the electrical box or to be cut around the electrical box to provide room around the electrical box to adjust the position of the fiberglass batt.

This activity may result in circumstances where the electrical box has little or no insulation behind it or around it.

In addition, because the electrical wires are threaded through a hole or "knockout" in the electrical box, there exists an air gap between the wires entering the electrical box and the knockout.

The lack of a seal between the electrical wires and the electrical box, coupled with the lack of insulation behind or around the electrical box both contribute to a lack of an insulative seal that permits air to infiltrate around and into the electrical box and, eventually, into the room. The circulation of air around and in the electrical box presents an area that enhances convective effects of the air that degrades the overall efficacy of the insulation installed in the wall, between the studs. This degrades the overall thermal insulation value of the wall itself.

Typically, after the drywall is installed, the electrician returns to install the electrical outlets and switches into the electrical boxes that were previously positioned throughout the structure. Typically, there is no further addition or adjustment of insulation at this point in construction.

As may be appreciated from the foregoing, cold and/or hot air may circulate around and through the electrical boxes in various seasons. It is, therefore, not uncommon for a person to feel, for example, cold air exiting from an electrical outlet or switch during the winter.

As should be apparent, losses of insulation add unnecessarily to the heating and/or cooling costs for a particular structure.

There has, therefore, developed a need to minimize insulative losses associated with electrical boxes.

SUMMARY OF THE INVENTION

The present invention addresses one or more of the deficiencies noted with respect to the prior art.

In one contemplated embodiment, the present invention provides an electrical box with a top side wall, a right side wall, a bottom side wall, a left side wall, and a rear side wall. At least one check valve is disposed in an opening through at least one of the top side wall, the right side wall, the bottom side wall, the left side wall, or the rear side wall. The check valve defines a central opening through which insulation may be introduced to fill an air gap at least one of behind or around the electrical box.

In another embodiment of the present invention, the top side wall, the right side wall, the bottom side wall, the left side wall, and the rear side wall are integrally formed to create a five-sided enclosure capable of housing at least one of an electrical outlet or an electrical switch.

In still another contemplated embodiment, the top side wall, the right side wall, the bottom side wall, the left side wall, and the rear side wall comprise plastic.

The check valve of the present invention is contemplated to include a peripheral ring and a plurality of flexible fingers extending inwardly from the peripheral ring to a predetermined location to define a central opening. The flexible fingers are separated from one another by gaps. A rear body extends rearwardly from the peripheral ring. A plurality of engagement fingers is disposed in the rear body.

In a further embodiment of the present invention, the peripheral ring, the plurality of flexible fingers, the rear body, and the plurality of engagement fingers are integrally formed.

It is contemplated that the peripheral ring, the plurality of flexible fingers, the rear body, and the plurality of engagement fingers may be made from plastic.

It is also contemplated that the plurality of flexible fingers may be pie shaped.

In another embodiment of the present invention, the rear body is frusto-conically shaped, with a larger diameter portion being disposed adjacent to the peripheral ring.

For the present invention, each of the engagement fingers are contemplated to include a flexible body, a tab protruding from the flexible body, a tapered section defined by the tab, and an engagement portion defined by the tab. The engagement portion is adjacent to the tapered section, permitting the plurality of engagement fingers to engage the wall forming the opening.

It is also contemplated that the rear body of check valve may define a gap around at least three sides of each of the plurality of engagement fingers, thereby permitting the engagement fingers to flex when the rear body is inserted into the opening.

The present invention also encompasses a method for providing insulation at least one of behind or adjacent to an electrical box. The method includes providing an electrical box having a top side wall, a right side wall, a bottom side wall, a left side wall, and a rear side wall, and at least one check valve disposed in an opening through at least one of the top side wall, the right side wall, the bottom side wall, the left side wall, or the rear side wall, wherein the check valve defines a central opening. The method also includes positioning a nozzle through the central opening, injecting insulation into an air space adjacent to the electrical box, through the check valve, and removing the nozzle after a predetermined amount of insulation has been injected through the check valve.

In one contemplated embodiment of the method, the insulation is foam, possibly polyurethane foam.

In another contemplated embodiment, the insulation is made up of insulation beads, possible made from polystyrene.

Other aspects of the present invention will become apparent from the discussion presented herein.

BRIEF DESCRIPTION OF THE DRAWINGS

The present invention is described in connection with the drawings appended hereto, in which.

DETAILED DESCRIPTION OF THE EMBODIMENT(S) OF THE INVENTION

The present invention will now be described in connection with one or more embodiments. The discussion of selected embodiment(s) of the present invention is meant to be exemplary of the scope of the present invention and not limiting of the present invention. As should be appreciated by those skilled in the art, there are numerous variations and equivalents of the present invention that will become apparent from the following discussion. The present invention is intended to encompass those variations and equivalents.

Figure 1:
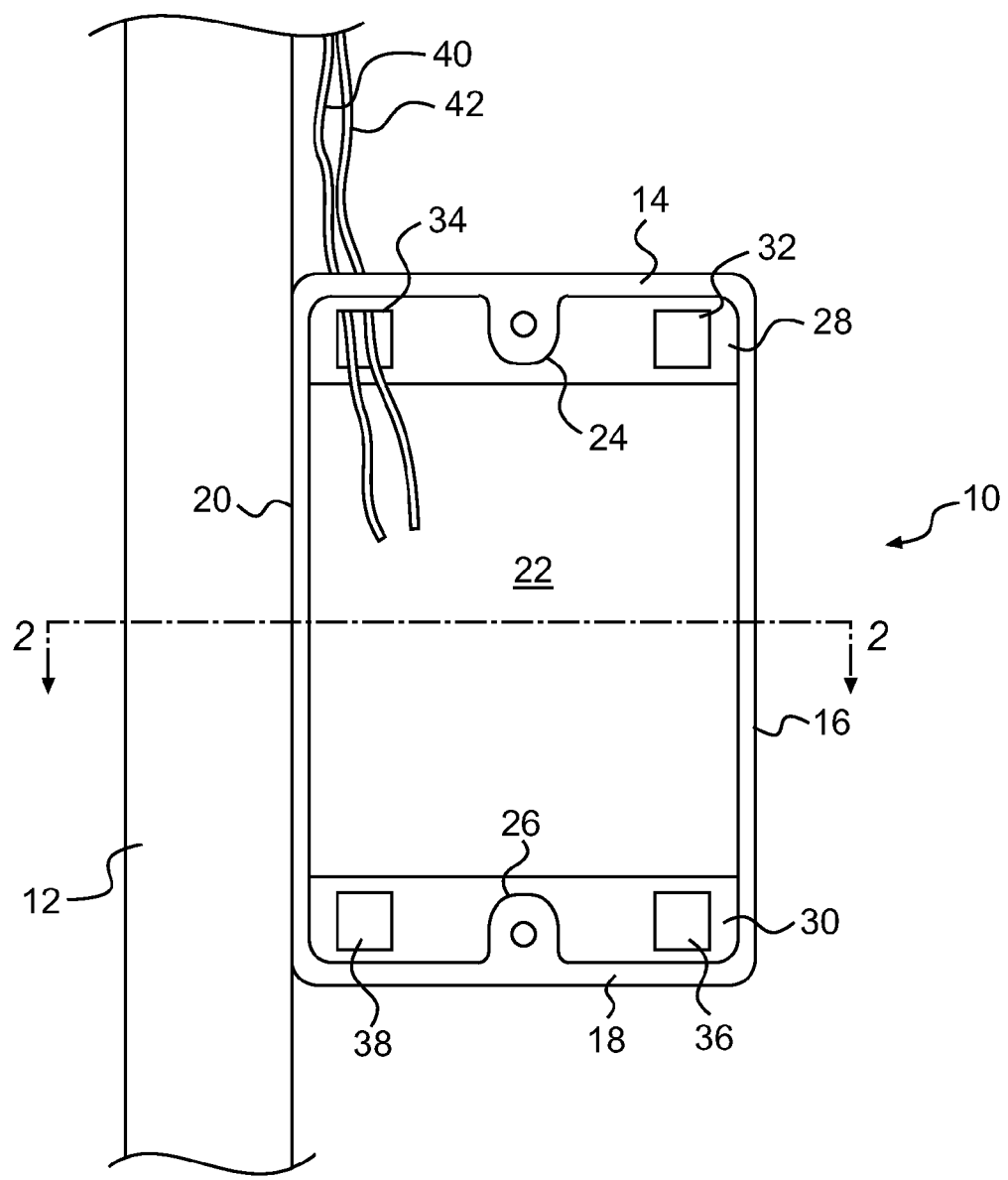
FIG. 1 is an elevational view of an electrical box according to the prior art.

FIG. 1 illustrates one prior art example of an electrical box 10 from a front perspective. The electrical box 10 in this view is positioned adjacent to a stud 12, which may be a framing element for a wall made from a wood or metal material. The electrical box is attached to the stud 12 via a suitable fastener such as a nail, screw, or the like (not shown).

The electrical box 10 includes five side walls, a top side wall 14, a right side wall 16, a bottom side wall 18, a left side wall 20, and a rear side wall 22. The top side wall 14 includes a top fastener receiver 24. The bottom side wall 18 also includes a bottom fastener receiver 26. The fastener receivers 24, 26 are intended to receive screws that affix an outlet plate or a switch plate to the electrical box 10. The outlet plate or switch plate are considered to be of a standard type that would be available in a typical home or business.

In the illustrated example, the electrical box 10 includes an angled top wall 28 and an angled bottom wall 30. The angled top wall 28 includes a top, right knockout 32 and a top, left knockout 34. The angled bottom wall includes a bottom, right knockout 36 and a bottom, left knockout 38. The knockouts 32, 34, 36, 38 are covered by small panels that may be removed to permit electrical wires to pass into the electrical box. For illustrative purposes, two electrical wires 40, 42 are illustrated as passing into the electrical box 10 through the top, left knock out 34.

Figure 2:
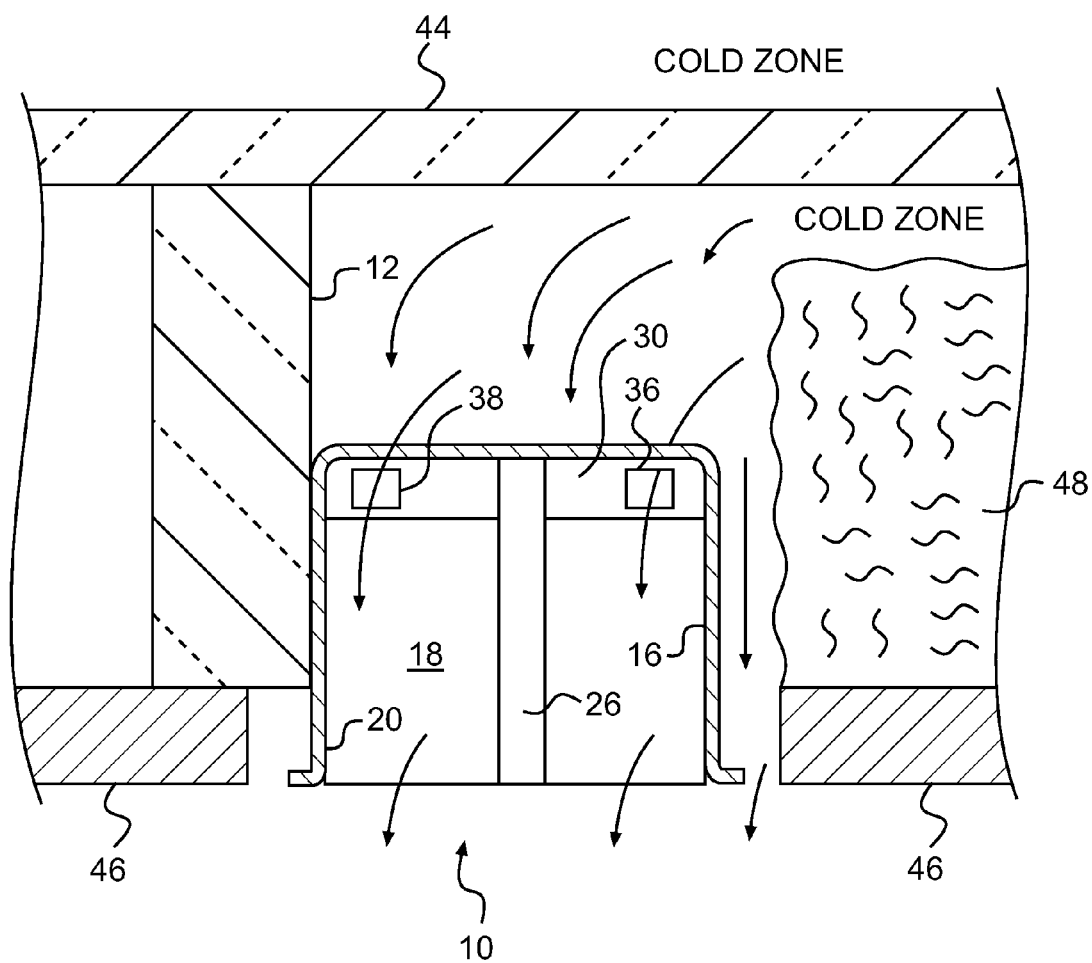
FIG. 2 is a cross-sectional, top view of an electrical box according to the prior art, as illustrated in FIG. 1, the cross-section being taken along the line 2-2 in FIG. 1.

FIG. 2 is a cross-sectional top view of the electrical box 10 that is illustrated in FIG. 1. The cross-section is taken along the line 2-2 in FIG. 1. In this illustration, further details are provided concerning the typical construction of a wall. For example, the exterior wall (typically plywood) surfacing 44, the drywall 46, and the fiberglass insulation batt 48 are illustrated in this drawing. Also illustrated are cold zones exterior to the plywood surfacing and interior to the plywood surfacing 44. The cold zone exterior to the plywood surfacing 44 may be the ambient environment outside of the structure (i.e., the home or business).

FIG. 2 illustrates one possible set of circumstances with respect to a failure of the insulative barrier due to typical construction techniques employed today, as discussed above.

When a cold zone is established, perhaps due to winter weather, air begins to circulate due to natural convective forces. The air circulation is indicated by arrows in FIG. 2. Due to air circulation, which may flow around and through the electrical box 10, the insulative value of the wall may be decreased.

Figure 3:
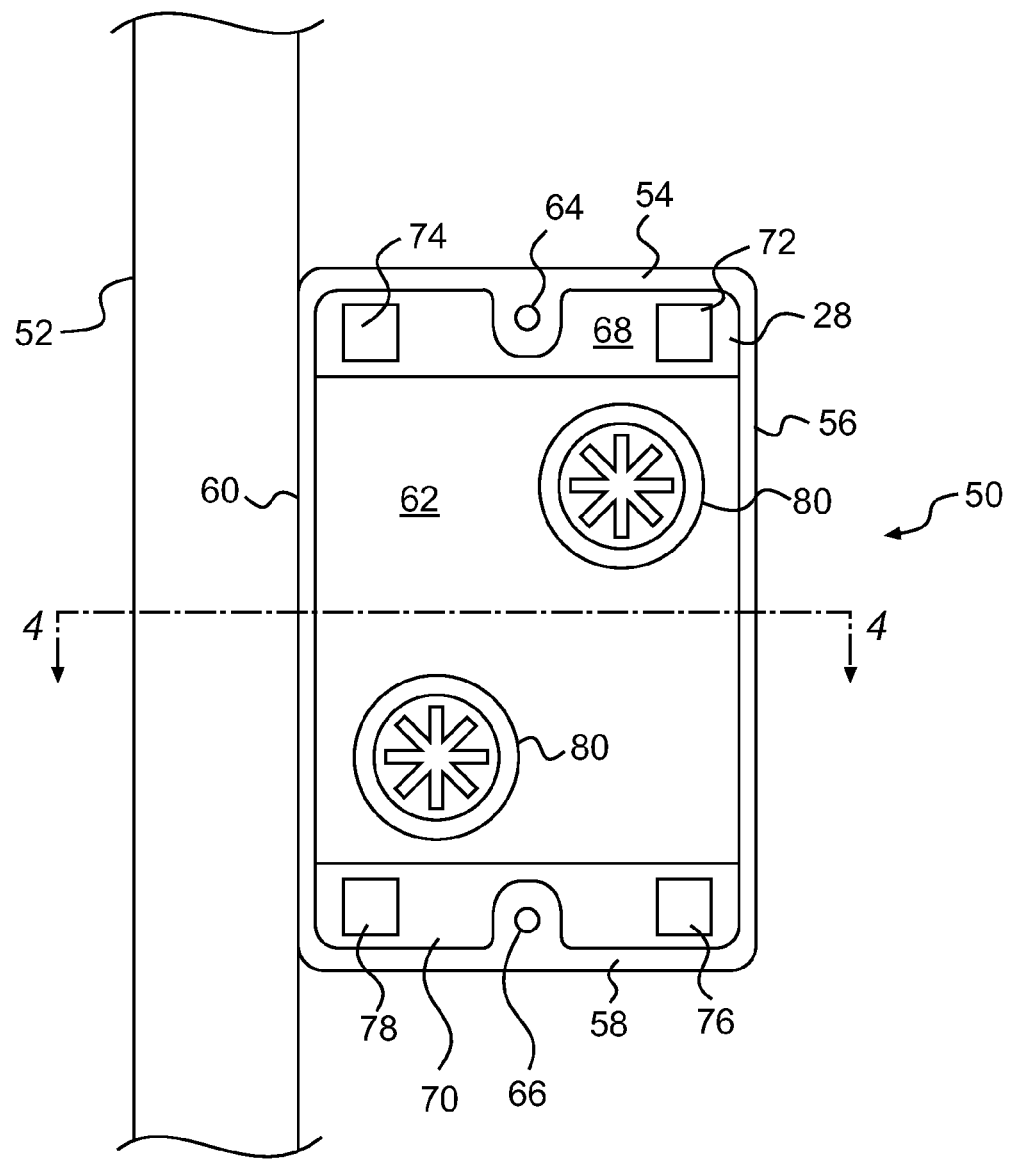
FIG. 3 is an elevational view of an electrical box according to the present invention.

FIG. 3 illustrates an electrical box 50 according to the present invention. The electrical box is shown, as with the prior art example, adjacent to a stud 52. The electrical box includes a top side wall 54, a right side wall 56, a bottom side wall 58, a left side wall 60, and a rear side wall 62. The electrical box 50 also includes a top fastener receiver 64 and a bottom fastener receiver 66. The electrical box also includes an angled top wall 68 and an angled bottom wall 70. In the angled top wall 66, there is a top, right knockout 72 and a top left knockout 74. In the angled bottom wall 70, there is a bottom right knockout 76 and a bottom left knockout 78. The knockouts 72, 74, 76, 78 include small elements that may be removed from the electrical box 50 to permit wires to be threaded into the electrical box 50, as in the prior art example.

It is noted that the electrical box 50 is contemplated to be a unitary structure made from a suitable plastic material. While this is the contemplated embodiment of the present invention, the electrical box 50 may be made from any suitable material including metal, for example.

With respect to the sides of the electrical box 50, the top, right, bottom, left, and rear sides 54, 56, 58, 60, 62 are anticipated to form a five-sided enclosure. A rectangular electrical box 50 is consistent with the standard currently relied upon in the construction industry. However, the present invention may be employed in a box that does not form a five-sided enclosure. It is contemplated that the sides may be combined with one another to form any other shape of polygonal enclosure or even an enclosure that does not have multiple sides (for example, a spherical or semi-spherical enclosure). The present invention is intended to encompass enclosures, whatever shape they may take.

As indicated in FIG. 3, the electrical box 50 includes two check valves 80 disposed through the rear wall 62. Details concerning the check valve 80 are provided below.

It is noted that, while two check valves 80 are illustrated, this is merely by way of example. It is anticipated that only a single check valve 80 will be disposed through the rear wall 62 of the electrical box 50. However, the present invention is not limited to a single check valve 80. A plurality of check valves 80 may be employed without departing from the scope of the present invention.

It is also noted that the check valve 80 need not be disposed through the rear side wall 62 to practice the present invention. Alternatively, the check valve may be inserted through the top side wall 54, the right side wall 56, the bottom side wall 58, or the left side wall 60. Moreover, where a plurality of check valves 80 is employed, one or more may be inserted through any of the walls of the electrical box 50.

Figure 4:
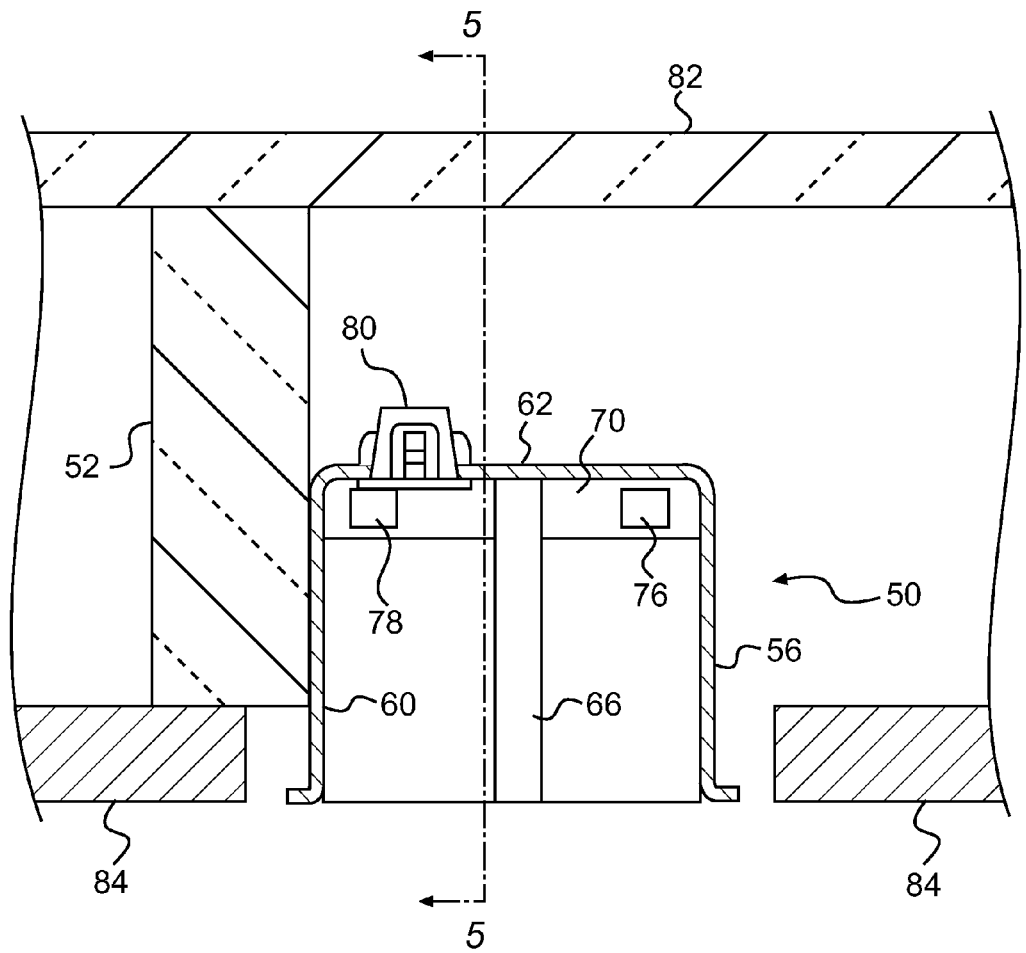
FIG. 4 is a cross-sectional, top view of an electrical box according to the present invention, the cross-section being taken along the line 4-4 in FIG. 3.

Before delving into the details of the check valves 80, reference is made to FIG. 4, which is a cross-section taken along line 4-4 in FIG. 3. The electrical box 50 is illustrated adjacent to the stud 52, as in FIG. 3. For additional clarity, the plywood surfacing 82 and the drywall 84 are included.

Figure 5:
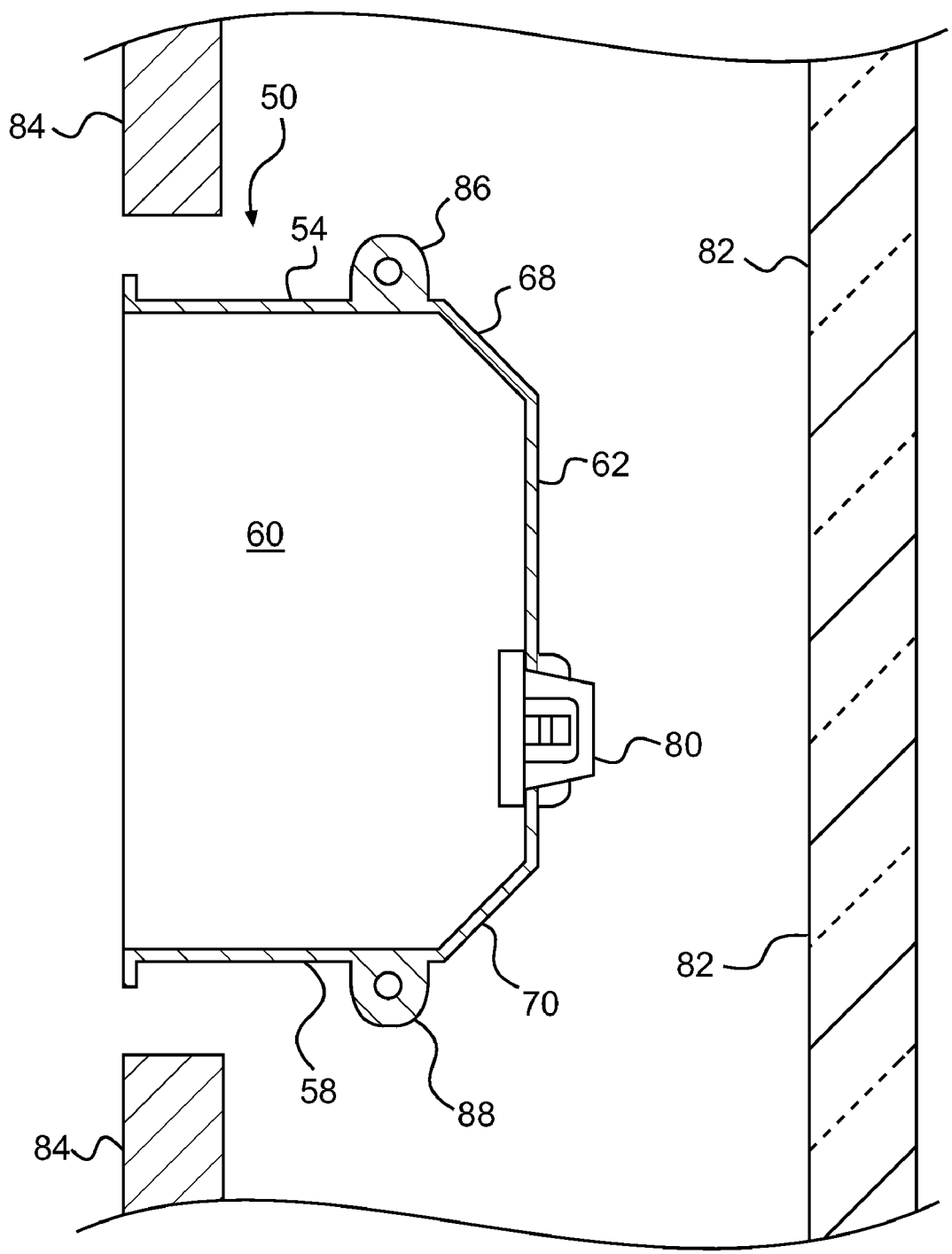
FIG. 5 is a cross-sectional side view of the electrical box of the present invention, the cross-section being taken along the line 5-5 in FIG. 4.

FIG. 5 is a cross-sectional illustration of the electrical box 50, taken along the line 5-5 in FIG. 4. Here, a cross-sectional side view is provided for additional clarity. In this illustration, the plywood surfacing 82 and the drywall 84 are provided for context, as in FIG. 4. FIG. 5 also illustrates two additional features of the electrical box 50. Specifically, a top fastener receiver 86 and a bottom fastener receiver 88 are shown. These fastener receivers 86, 88 are provided to receive a nail or other suitable fastener so that the electrical box 50 may be secured to the stud 52, for example.

Figure 6:
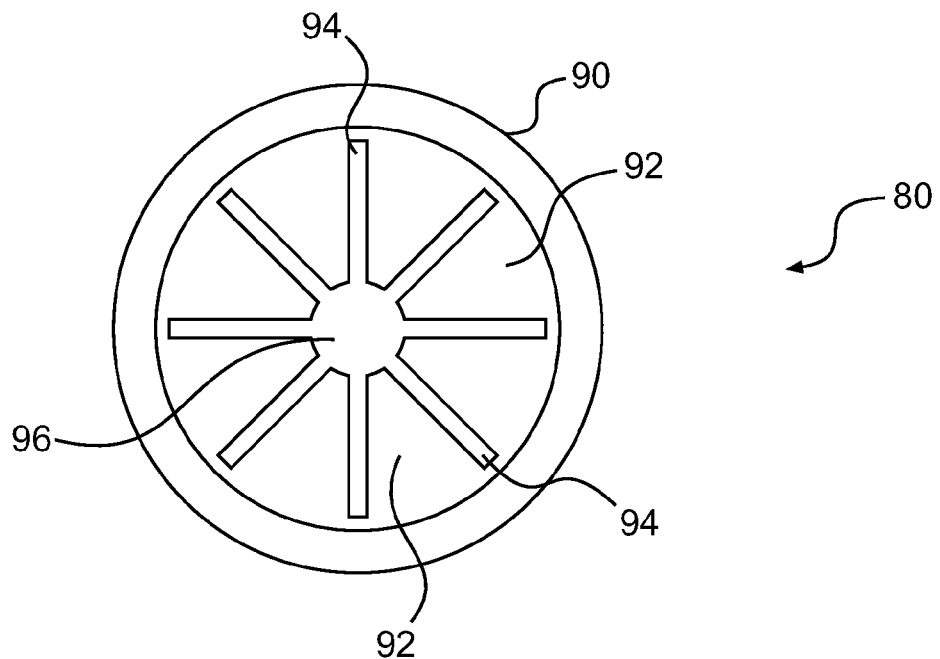
FIG. 6 is a front view of a check valve according to the present invention.

FIG. 6 provides a front view of one of the check valves 80 of the present invention. The check valve 80 includes a peripheral ring 90 that supports eight flexible fingers 92 therein. The flexible fingers 92 are separated from one another by gaps 94 that converge on a central opening 96 in the check valve 80. The flexible fingers 92 are integrally formed with the peripheral ring 90, at least in the illustrated embodiment. The flexible fingers 92, however, do not need to be integrally formed with the peripheral ring 90.

In addition, it is noted that eight flexible fingers 92 are not required to practice the present invention. A larger or smaller number may be employed without departing from the scope of the present invention.

Also, while the flexible fingers 92 are shown as being pie shaped, the flexible fingers 92 may take any suitable shape. Moreover, while the flexible fingers 92 are illustrated as being symmetrically shaped and positioned, this not required to practice the present invention.

Figure 7:
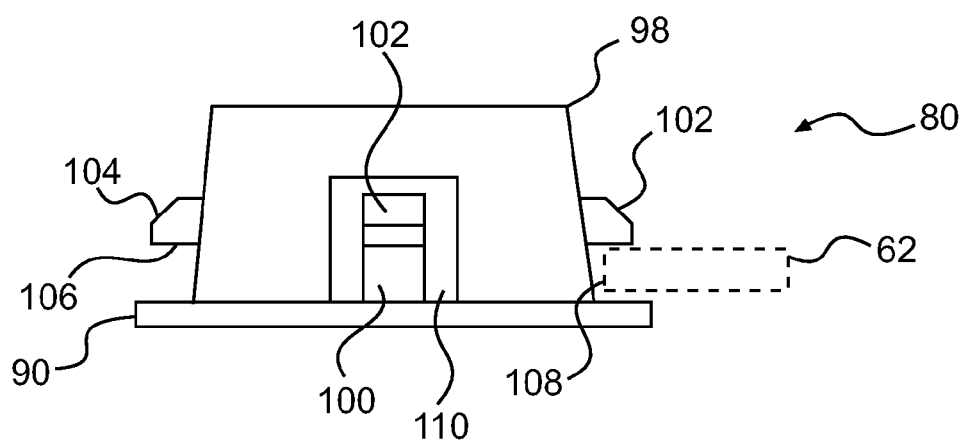
FIG. 7 is a top view of the check valve according to the present invention.

With reference to FIG. 7, which is a top view of the check valve 80, the rear body 98 of the check valve 80 is visible. The rear body 98 is illustrated as a frusto-conically shaped member that extends from the peripheral ring 90. The frusto-conical shape is provided to permit the check valve to be inserted into a hole in the rear wall 62 of the electrical box 50. As a result, the end of the rear body that is distal to the peripheral ring 90 has a diameter that is slightly smaller than the diameter of the rear body 98 adjacent to the peripheral ring 90.

As may be appreciated, the rear body may be cylindrically shaped without departing from the scope of the present invention.

Separately, it is envisioned that the check valve 80 may be made into any suitable shape, as desired. For example, rather than being circular, the check valve could be ovoid, square, rectangular, polygonal, etc.

The rear body includes four engagement fingers 100, three of which are at least partially visible in the illustration. The engagement fingers include protruding tabs 102 that extend outwardly from the rear body 98. The protruding tabs 102 include angled surfaces 104 that are designed compress the engagement fingers 100 when the check valve 80 is inserted into an opening 108 in the rear wall 62 of the electrical box 50.

Since the engagement fingers 100 are flexible, the resume their initial shape after clearing the rear wall 62. At this point the engagement surfaces 104 engage the rear wall 62 to secure the check valve 80 in the opening 108. As also illustrated, the engagement fingers 100 are separated on three sides from the rear body 98 by a gap 110 that permits the engagement fingers 100 to flex.

The engagement fingers 100 are integrally formed with the remainder of the check valve 80, as illustrated. The engagement finder 100, however, need not be integrally formed with the check valve 80 but may be added as separate elements without departing from the scope of the present invention.

The check valve 80, together with its associated features, is intended to be constructed from a plastic material. However, the check valve may be made from any other suitable material, including metal, as should be appreciated by those skilled in the art.

Figure 8:
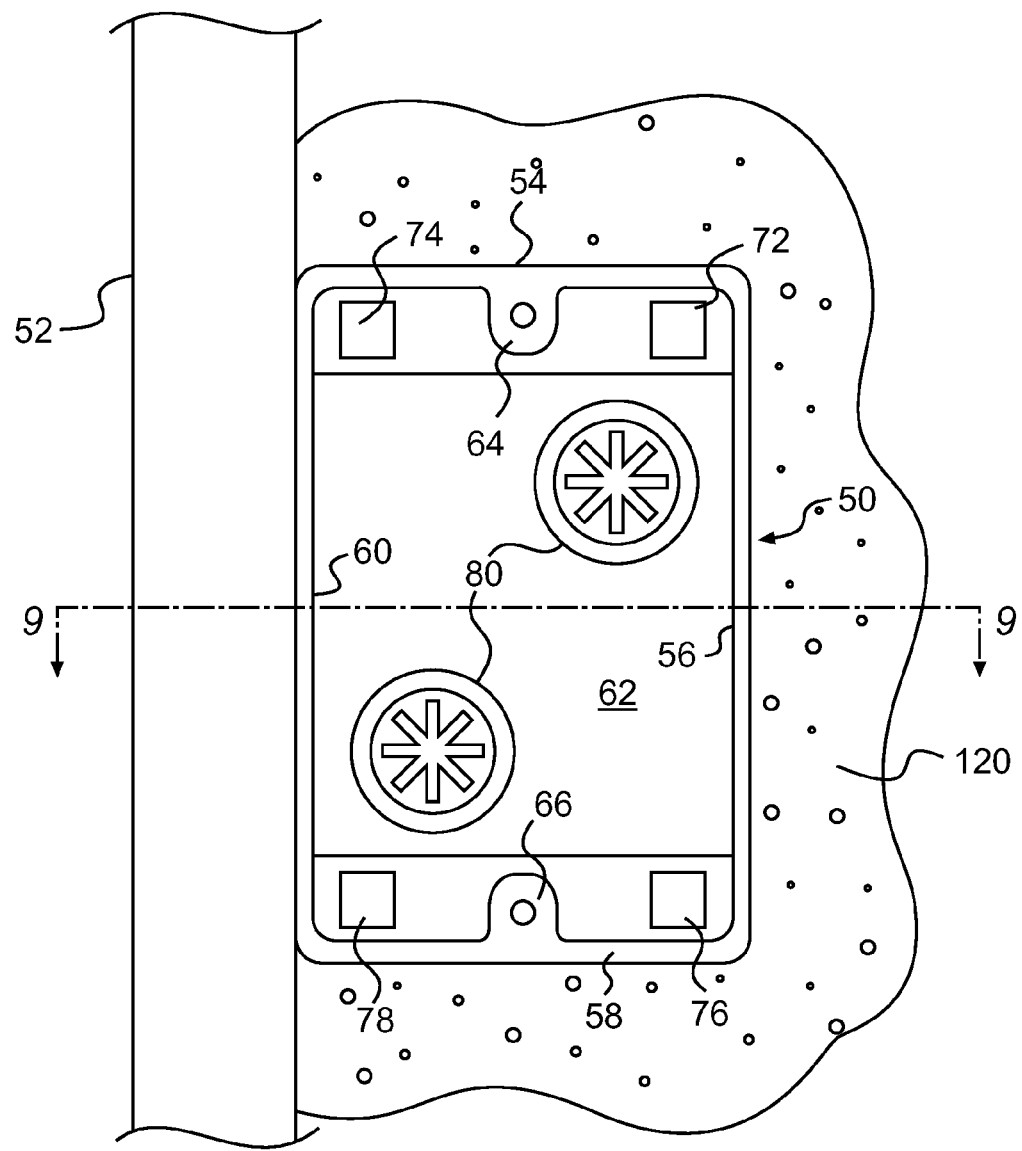
FIG. 8 is a front elevational view of the electrical box of the present invention, showing the disposition of foam insulation therearound.
Figure 9:
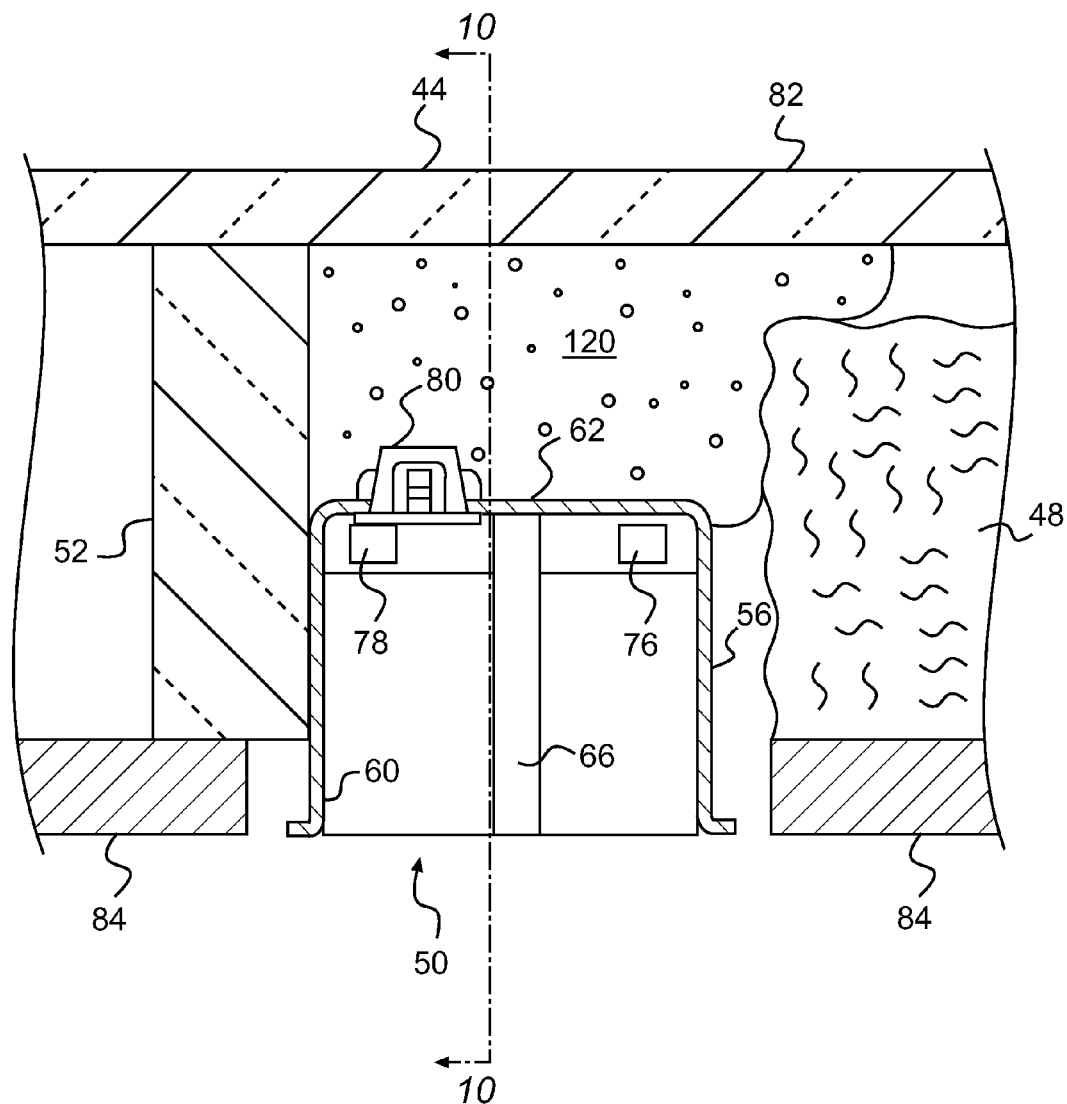
FIG. 9 is a cross-sectional top view of the electrical box, with the cross-section being taken along line 9-9 in FIG. 8.
Figure 10:
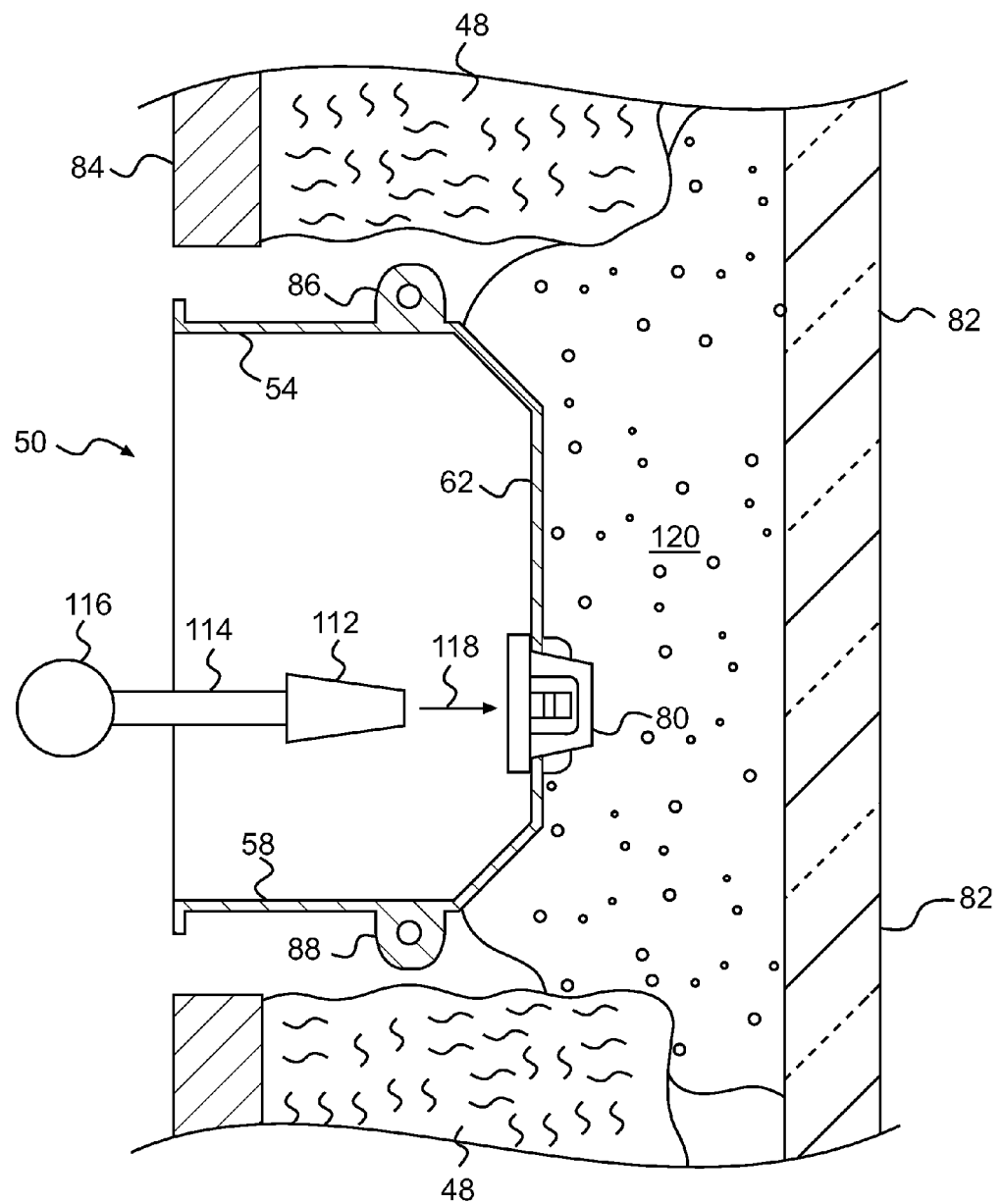
FIG. 10 is a cross-sectional side view of the electrical box of the present invention, with the cross-section being taken along line 10-10 in FIG. 9.

FIGS. 8-10 illustrate the method of the present invention, which is now described.

After the electrical box 50 is affixed to a suitable structure, such as the stud 52, a nipple or nozzle 112, connected to a tube 114, which is connected to a foam source 116, is inserted through the check valve 80. The insertion direction is indicated by the arrow 118. Foam 120 is then introduced, via the nozzle 112 into the air space behind and around the electrical box 50. The foam 120 cures to establish a suitable insulation "plug" in the air space.

After the foam 120 is injected into the air space, the nozzle 112 is removed from the check valve 80 to permit the foam to cure in situ. Typical insulative foams expand when exposed to air.

It is noted that the user who injects the foam is able, via the gaps 94 in the check valve 80 to see when the foam has filled the air space, even after the drywall 84 is installed. Since the foam 120 preferably is a liquid, the foam will begin to seep through the gaps 94, which is an indication that a sufficient quantity of foam has been injected into the air space behind and around the electrical box 50.

As for the foam 120, it is contemplated that any suitable insulative foam may be employed. One contemplated foam is polyurethane foam, however, this is meant to be illustrative and not limiting of the present invention. It is contemplated, for example, that the foam 120 may be substituted for a non-liquid insulation, which may include small pellets or beads of insulation, as would be understood by those skilled in the art. Polystyrene may be employed if the insulation is provided in the form of pellets or beads.

The present invention also contemplates that the check valve 80 may be used in a reverse orientation to the one discussed above and illustrated in FIGS. 3-10. Specifically, it is contemplated that the check valve may be disposed through one of the side walls 54, 56, 58, 60, and 62 such that insulation may be introduced into the interior of the electrical box 50, around the electrical outlet or switch disposed therein. In this embodiment, the electrical outlet or switch would first be installed into the electrical box 50 and the cover plate attached. The insulation would then be introduced into the electrical box 50. This could be done to further enhance the insulative properties of the present invention.

Figure 11:
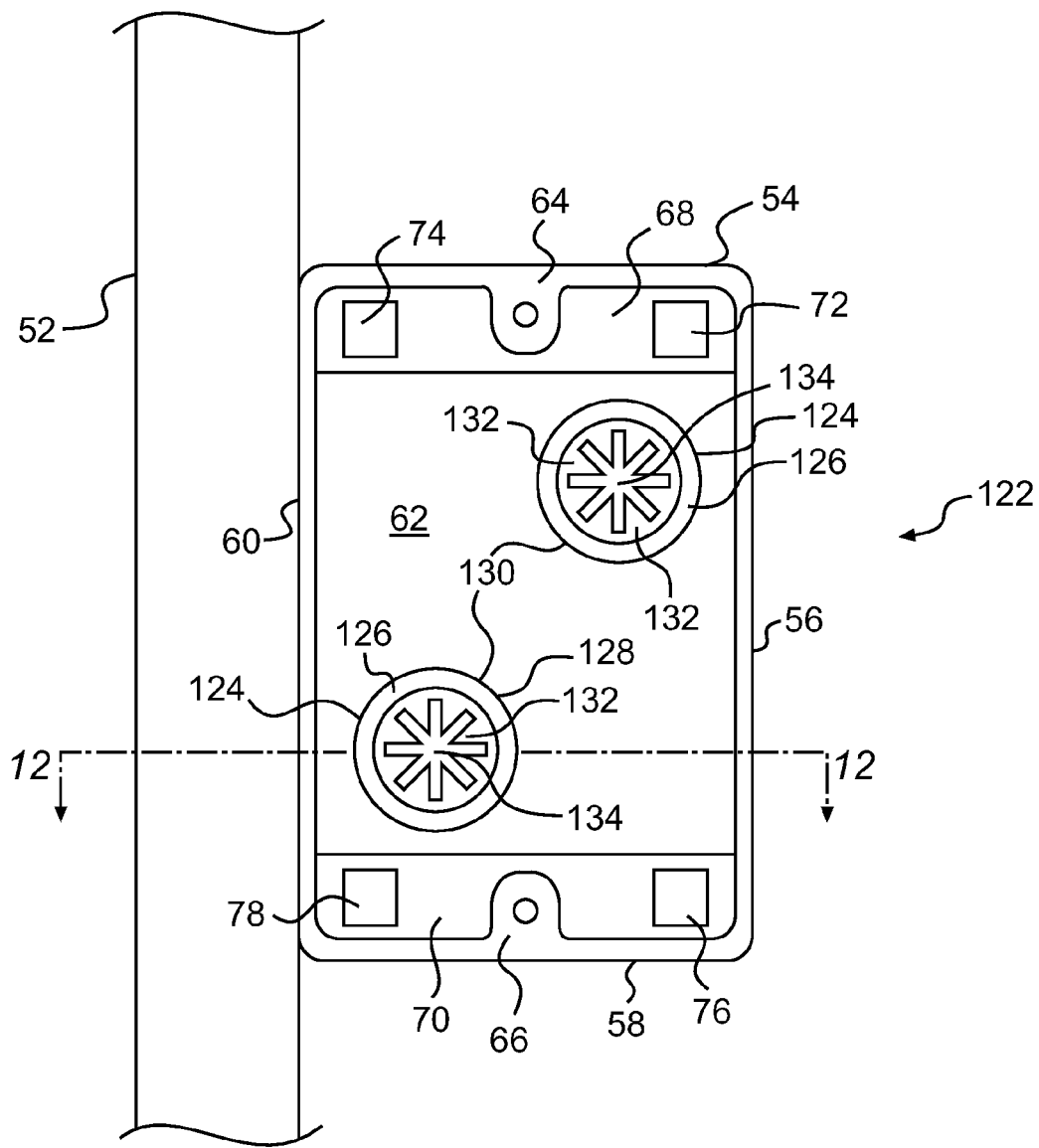
FIG. 11 is a front view of another embodiment of an electrical box according to the present invention.
Figure 12:
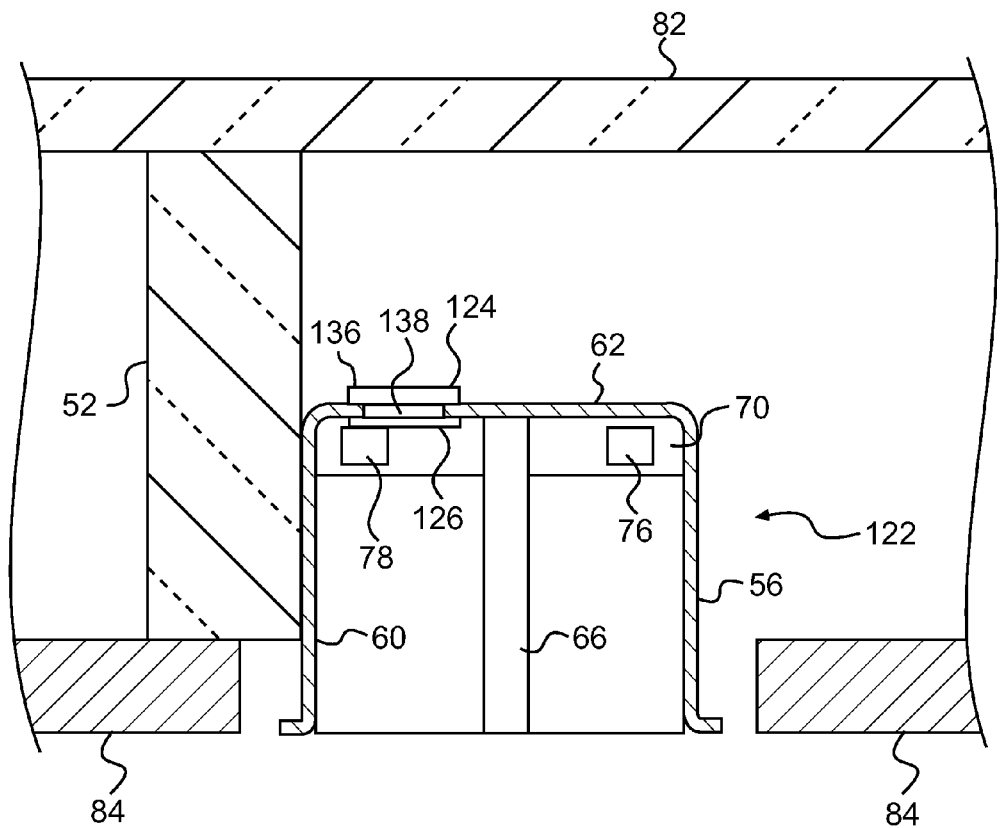
FIG. 12 is a cross-sectional top view of the electrical box shown in FIG. 11, the cross-section being taken along line 12-12 in FIG. 11.
Figure 13:
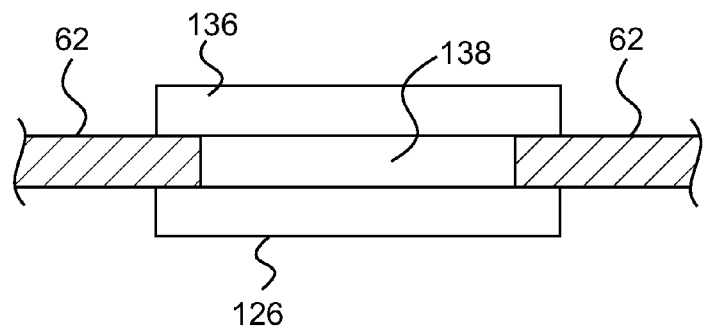
FIG. 13 is an enlarged top view of the check valve of the present invention, which is illustrated in FIG. 12.

FIGS. 11-13 illustrate yet another contemplated embodiment of the electrical box 122 of the present invention. In this embodiment, the construction of the check valves 124 differs from the prior embodiment, as discussed below. To the extent that the remaining structure of the electrical box 122 is similar to the electrical box 50, the same reference numbers are used for convenience.

As illustrated in FIG. 11, the electrical box 122 includes two check valves 124 that are disposed through the rear wall 62. As discussed above, a larger or a smaller number of check valves 124 may be employed without departing from the scope of the present invention. Moreover, the check valves 124 need not be disposed solely through the rear wall 60, but may be disposed through one or more of the side walls 54, 56, 58, 60, as should be appreciated by those skilled in the art.

FIG. 12 is a cross-sectional top view of the electrical box 122 illustrated in FIG. 11 with the cross-section being taken along line 12-12 in FIG. 11. Here, that the construction of the check valves 124 is more clearly depicted with respect to the electrical box 122.

The check valves 124 differ from the check valves 80 in that they are integrally molded into the body of the electrical box 122. Specifically, in this embodiment, it is anticipated that the body of the electrical box 122 will be manufactured with openings for the check valves 124. The check valves 124 may then be injection molded into the openings so that they are permanently (or semi-permanently) affixed in the electrical box 122.

As illustrated in FIG. 11, the check valves include an outer peripheral portion 126 that is defined by an outer peripheral edge 128 and an inner peripheral edge 130. Flexible fingers 132 extend inwardly, toward a central opening 134.

FIG. 13 provides an enlarged, top view of the check valve 124 that is illustrated in FIG. 12. As shown, the check valve 124 includes a front peripheral portion 126, as discussed above, and a rear peripheral portion 136 that are joined together by an intermediate portion 138. It is expected that the flexible fingers 132 will extend inwardly within the intermediate portion 138, but this is not required to practice the present invention.

While there are many ways in which the check valves 124 may be integrally provided in the electrical box 122, it is anticipated that the check valves 124 may be made as two separate parts that are joined together via an adhesive, thermal welding, and/or ultrasonic welding. As should be apparent to those skilled in the art, any number of techniques may be employed to create the check valves 124 without departing from the scope of the present invention.

Alternatively, it is contemplated that the check valves 124 may be a single piece construction. In this contemplated embodiment, the check valves 124 may be inserted through the opening and the rear portion 136 may be formed after insertion by any suitable methodology.

In still another contemplated embodiment, the check valves 124 may be injection molded into the openings in situ.

FIGS. 14-17 illustrate yet another contemplated embodiment of the electrical box 140 of the present invention. In this embodiment, the construction of the check valves 142 differs from the prior embodiment, as discussed below. To the extent that the remaining structure of the electrical box 140 is similar to the electrical box 50, the same reference numbers are used for convenience.

In this embodiment, the check valves 142 are molded or machined into the walls of the electrical box 140. As before, while two check valves 142 are illustrated, the present invention may include a greater or a smaller number of check valves 142. As also discussed above, the check valves 142 may be provided through the side walls in addition to or instead of being disposed through the rear wall 62.

As in prior embodiments, the check valves 142 include flexible fingers 144 that extend toward a central opening 146. As illustrated, the check valves 142 also are defined by a peripheral edge 148, where the structure thins by comparison with the adjacent wall 62.

Figure 14:
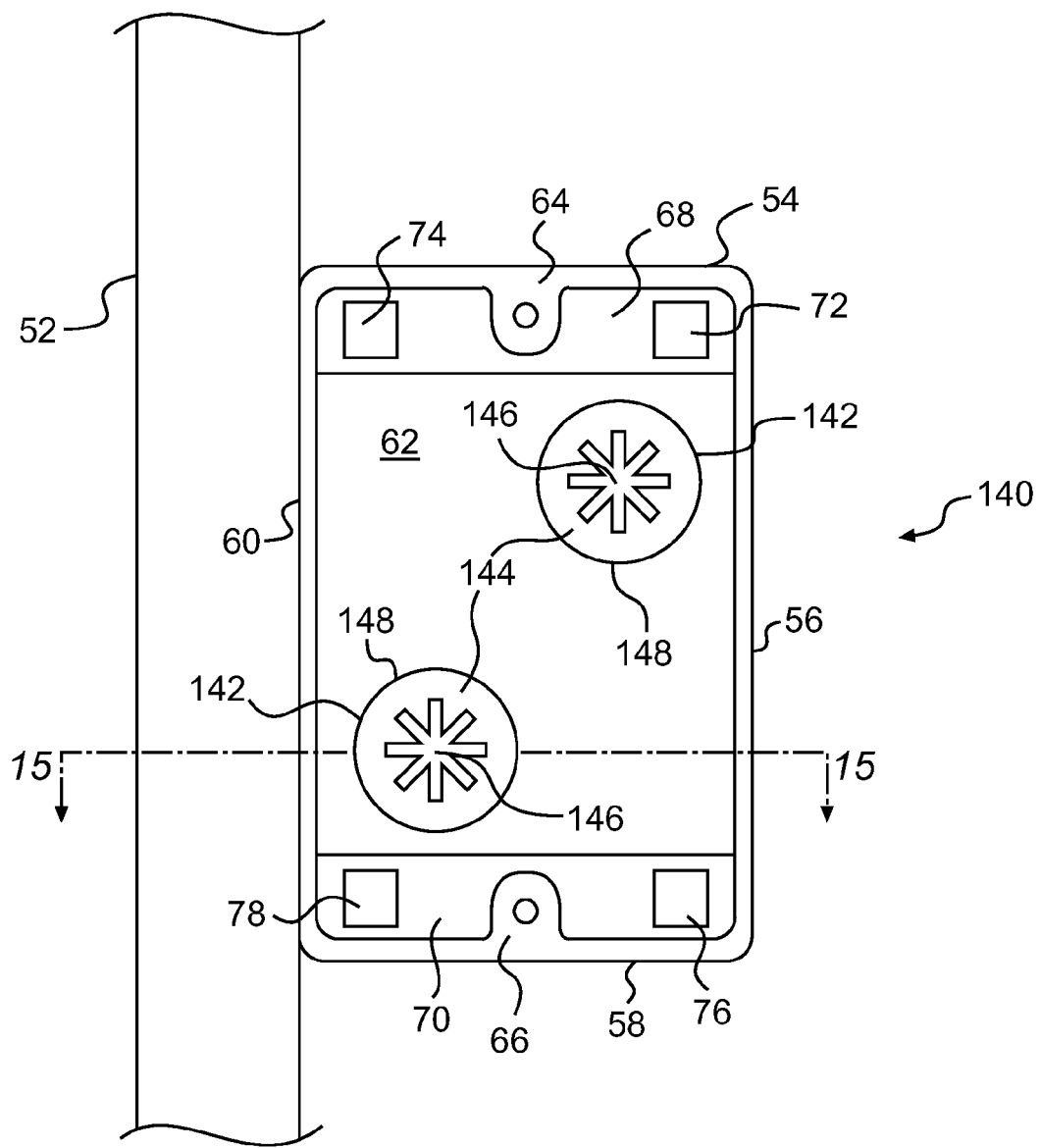
FIG. 14 is a front view of an additional embodiment of the electrical box of the present invention.
Figure 15:
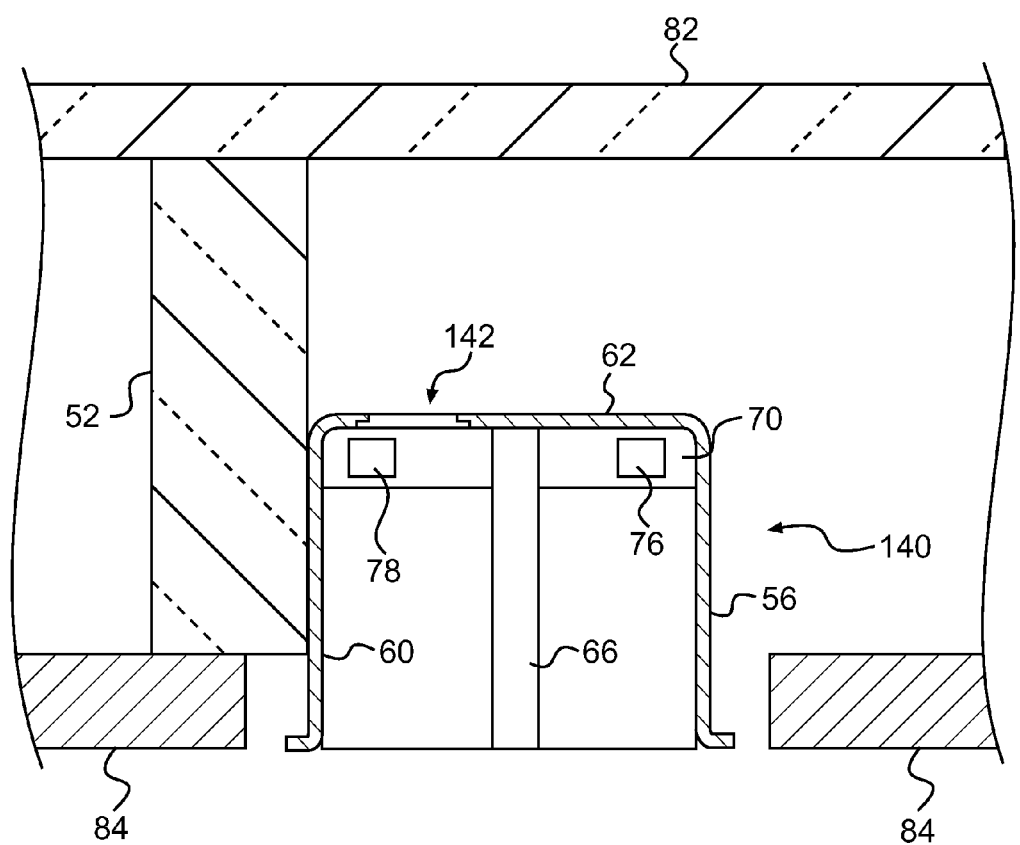
FIG. 15 is a cross-sectional top view of the electrical box shown in FIG. 14, with the cross-section being taken along line 15-15 in FIG. 14.

FIG. 15 provides a top, cross-sectional view of the electrical box 140 illustrated in FIG. 14. FIG. 15 is taken along the line 15-15 in FIG. 14. The check valve 142 is illustrated in this view.

Figure 16:
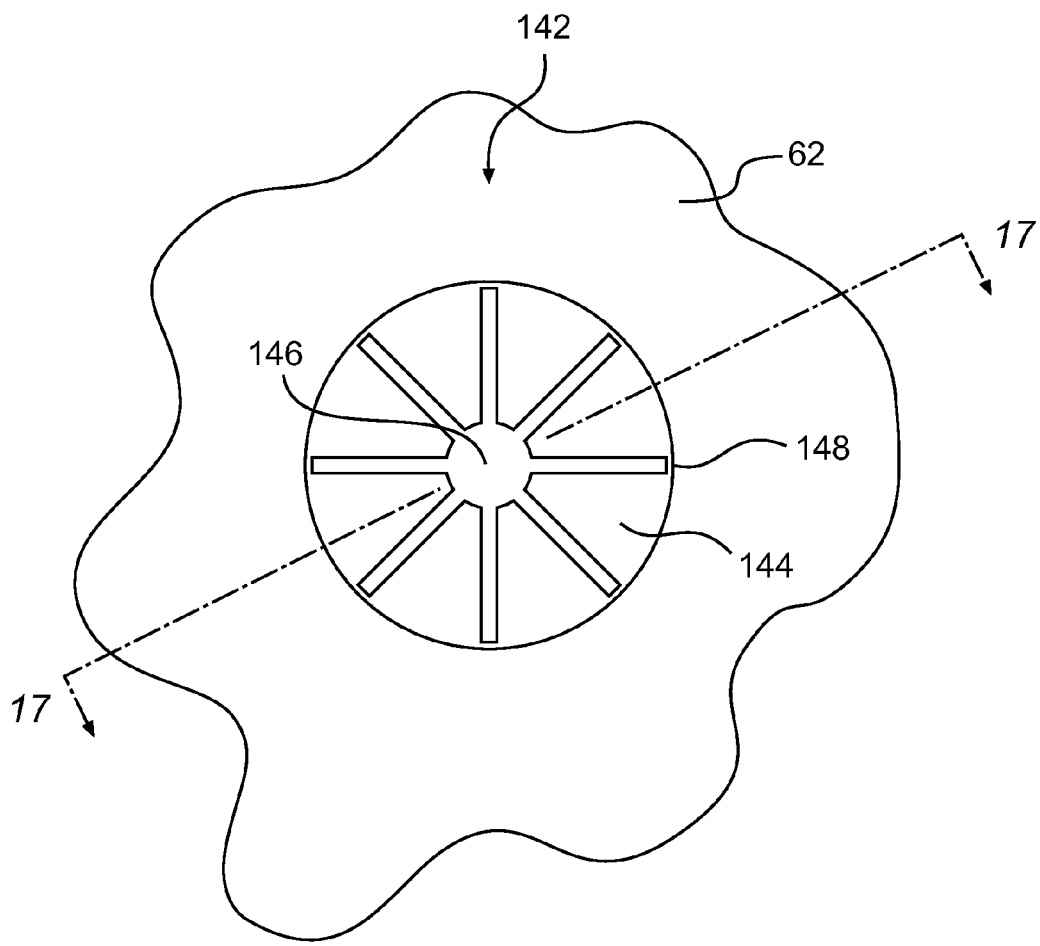
FIG. 16 is an enlarged front view of one of the check valves of the present invention, as depicted in FIG. 14.

FIG. 16 is an enlarged front view of one of the check valves 142 shown in FIG. 14. Here, the flexible fingers 144 and the peripheral edge 148 are more clearly depicted.

Figure 17:
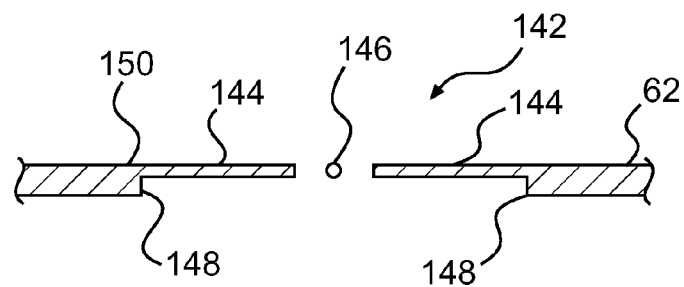
FIG. 17 is a cross-sectional view of the check valve illustrated in FIG. 16, the cross-section being taken along the line 17-17 in FIG. 16.

FIG. 17 is a cross-section of the check valve 142 illustrated in FIG. 16, with the cross-section being taken along line 17-17 in FIG. 16.

FIG. 17 illustrates the flexible fingers 144 as being smaller in thickness than the associated rear wall 62. While this configuration is believed to assist with the flexibility of the fingers 144, the flexible fingers 144 need not be thinner than the rear wall 62. It is contemplated that the flexible fingers 144 may be of the same thickness or even thicker than the rear wall 62, as required or desired.

In addition, while the flexible fingers 144 are shown as being flush with the rear surface 150 of the rear wall 62, the flexible fingers 144 need not be positioned in this manner. It is contemplated that the flexible fingers 144 may be positioned at any point along the thickness of the wall 62 without departing from the scope of the present invention.

Being a part of the rear wall 62, the check valves 142 are made from the same material as the rear wall 62. As discussed previously, the material may be metal, plastic, or any other suitable material, as should be apparent to those skilled in the art.

It is noted that some features of the present invention may be discussed in connection with a particular embodiment. It is intended that features discussed in connection with one embodiment may be employed in other embodiments without departing from the scope of the present invention. In other words, while features of the present invention may be discussed in connection with a particular embodiment, it is intended that those features may be incorporated into other embodiments in addition to or in substitution of features discussed with respect to the other embodiments.

As noted above, the present invention is not intended to be limited solely to the embodiments described herein. As should be appreciated from the discussion herein, there are numerous variations and equivalents that may be employed without departing from the scope of the present invention. Those variations and equivalents are intended to be encompasses by the present invention.

What is claimed is:

1. An electrical box, comprising:
   a top side walk a right side wall, a bottom side wall, a left side walk and a rear side wall; and
   at least one check valve disposed through at least one of the top side wall, the right side wall, the bottom side wall, the left side wall, or the rear side wall,
   wherein the check valve defines a central opening through which insulation may be introduced to fill an air gap at least one of behind or around the electrical box, and
   wherein the check valve comprises a peripheral ring and a plurality of flexible fingers extending inwardly from the peripheral ring to a predetermined location to define the central opening, the flexible fingers being separated from one another by gaps.

2. The electrical box of claim 1, wherein:
   the top side wall, the right side wall, the bottom side wall, the left side wall, and the rear side wall are integrally formed to create a five-sided enclosure capable of housing at least one of an electrical outlet or an electrical switch.

3. The electrical box of claim 2, wherein the top side wall, the right side walk the bottom side wall, the left side wall, and the rear side wall comprise plastic.

4. The electrical box of claim 1, wherein the check valve further comprises:
   a rear body extending rearwardly from the peripheral ring; and
   a plurality of engagement fingers disposed in the rear body.

5. The electrical box of claim 4, wherein the peripheral ring, the plurality of flexible fingers, the rear body, and the plurality of engagement fingers are integrally formed.

6. The electrical box of claim 5, wherein the peripheral ring, the plurality of flexible fingers, the rear body, and the plurality of engagement fingers comprise plastic.

7. The electrical box of claim 4, wherein the rear body is frusto-conically shaped, with a larger diameter portion being disposed adjacent to the peripheral ring.

8. The electrical box of claim 4, wherein each of the plurality of engagement fingers comprise:
   a flexible body;
   a tab protruding from the flexible body;
   a tapered section defined by the tab; and
   an engagement portion defined by the tab, adjacent to the tapered section, permitting the plurality of engagement fingers to engage the wall forming the opening.

9. The electrical box of claim 4, wherein the rear body defines a gap around at least three sides of each of the plurality of engagement fingers, thereby permitting the engagement fingers to flex when the rear body is inserted into the opening.

10. The electrical box of claim 1, wherein the plurality of flexible fingers are pie shaped.

11. The electrical box of claim 1, wherein the at least one check valve is disposed in an opening through at least one of the top side wall, the right side wall, the bottom side wall, the left side wall, or the rear side wall.

12. The electrical box of claim 1, wherein the at least one check valve is integrally formed with the at least one of the top side wall, the right side wall, the bottom side wall, the left side wall, or the rear side wall.

13. The electrical box of claim 1, wherein the at least one check valve is at least one of molded with or machined from at least one of the top side wall, the right side wall, the bottom side wall, the left side wall, or the rear side wall.

14. A method for providing insulation at least one of behind or adjacent to an electrical box, comprising:
   providing an electrical box comprising a top side wall, a right side wall, a bottom side wall, a left side wall, and a rear side wall, and at least one check valve disposed in an opening through at least one of the top side wall, the right side wall, the bottom side wall, the left side wall, or the rear side wall, wherein the check valve defines a central opening, and wherein the check valve comprises a peripheral ring and a plurality of flexible fingers extending inwardly from the peripheral ring to a predetermined location to define the central opening, the flexible fingers being separated from one another by gaps;
   positioning a nozzle through the central opening;
   injecting insulation into an air space adjacent to the electrical box, through the check valve; and
   removing the nozzle after a predetermined amount of insulation has been injected through the check valve.

15. The method of claim 14, wherein the insulation comprises foam.

16. The method of claim 15, wherein the foam comprises polyurethane.

17. The method of claim 14, wherein the insulation comprises insulation beads.

18. The method of claim 17, wherein the insulation beads comprise polystyrene.

* * * * *